United States Patent
Daniel

[15] 3,705,513
[45] Dec. 12, 1972

[54] ROLLING HIGH HELIX PINIONS
[72] Inventor: David W. Daniel, Birmingham, Mich.
[73] Assignee: Lear Siegler, Inc., Santa Monica, Calif.
[22] Filed: Nov. 19, 1970
[21] Appl. No.: 90,946

[52] U.S. Cl. ................... 72/102, 72/101, 29/159.2
[51] Int. Cl. ......................................... B21h 5/00
[58] Field of Search.......... 72/80, 101, 102, 105, 106, 72/107, 108, 109; 29/90 B, 159.2

[56] References Cited
UNITED STATES PATENTS 2,245,654   6/1941   Drader et al. ..................... 29/90
3,048,066   8/1962   Bregi et al. ........................ 72/81
3,087,356   4/1963   Newman ............................ 72/104

*Primary Examiner*—Lowell A. Larson
*Attorney*—Whittemore, Hulbert & Belknap

[57] ABSTRACT

Rolling pinions having a high helix angle using a helical roll with the teeth of the roll inclined at a helix angle such that axial thrust on the pinion due to inclination of the teeth is substantially counterbalanced by axial thrust due to crossed axes sliding.

7 Claims, 1 Drawing Figure

PATENTED DEC 12 1972
3,705,513
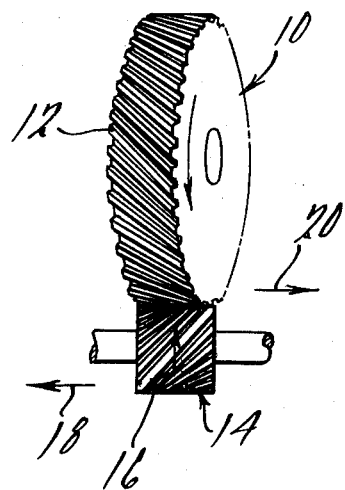
INVENTOR.
David W. Daniel
BY Whittemore,
Hulbert & Belknap
ATTORNEYS

ROLLING HIGH HELIX PINIONS

BRIEF SUMMARY OF THE INVENTION

When rolling pinions having a relatively high helix angle, where the pinion is driven in rotation by a gear-like rolling die, the forces applied to the teeth of the pinion as they are formed develop an axial component of force of very considerable magnitude. Up to the present time efforts to roll pinions of this type have generally been in an arrangement in which the axes of the pinion and gear-like rolling die are parallel.

According to the present invention the magnitude of the helix angle of the teeth of the rolling die are caused to differ from the magnitude of the helix angle of the teeth to be rolled on the pinion by a few degrees. The result of this is that to produce teeth of the required helix angle on the pinion, the axes of the pinion and die must be crossed by an angle determined by the difference in magnitude of the helix angles.

As a result of the crossed axes relationship between the die and gear, there is a relative sliding movement between the surfaces of the teeth on the die and the surfaces of the pinion teeth as they are formed, which is longitudinal of the teeth or generally parallel to the axis of the pinion. This sliding motion is referred to as crossed axes slide and is of course to be distinguished between the sliding action taking place between conventional involute gears at parallel axes which is referred to as involute slide. Involute slide varies from zero at the operating pitch line on the surfaces of the gear teeth to maxima adjacent the root and crest of the teeth, and the direction of specific sliding on the pinion tooth surfaces reverses at the pitch line and the specific direction (whether toward or away from the pitch line) depends upon whether the tooth surface is the leading or following surface of the tooth.

Accordingly, by appropriately selecting the helix angle of the die teeth, the rolling operation may produce forces resulting from the crossed axes slide, as defined heretofore, which balance or substantially balance the forces due to the rolling action on the inclined teeth.

BRIEF DESCRIPTION OF THE DRAWING

The FIGURE is a diagrammatic view in which the crossed axes angle is exaggerated for clarity, showing a rolling die in mesh with a pinion.

DETAILED DESCRIPTION

In rolling gears or pinions, and particularly in an operation in which a pinion is rolled from a solid cylindrical blank, present practice is to drive the gear-like rolling die positively in rotation and to drive the work blank as it is formed into a gear by the rotation of the die. The operation is carried out by providing a die having identically formed teeth around its periphery, and the formation of the teeth on the blank as the blank and die are rolled together, is accomplished by providing a relative depth feed of the die into the blank along the line joining the axes of the blank and die.

Referring now to the drawing there is illustrated a die 10 having inclined teeth 12. This die is shown as in mesh with a finished work piece or pinion 14 having helically inclined teeth 16. The illustration presupposes that the die has been moved radially into the blank to a depth sufficient to produce the teeth 16. Further, it may be assumed that the die is being positively driven in the direction of rotation indicated by the arrow superimposed thereon, in which case of course the pinion is being rotated in the direction suggested by the arrow superimposed on the pinion.

Where the teeth of the pinion have a relatively great helix angle as for example substantially above 45°, forces are developed in driving the pinion in rotation which are essentially perpendicular to the teeth and which therefore have a component of force directed axially of the pinion. Such component of force is indicated by the arrow 18 and it will be observed that this force is to the left as seen in the FIGURE.

It is further to be understood that this force, due to the driving relationship between the die and pinion and the direction of inclination of the teeth, is substantially independent of any crossed axes relationship between the pinion and die. This force or a force substantially equal to this force would be present if the pinion were rolled by a die whose teeth had equal but opposite helix angle so that the axes of the die and pinion were parallel.

However, when the axes of the pinion and die are crossed as indicated in the FIGURE, it will be appreciated that there is a relative sliding motion introduced between the teeth of the die and the teeth as they are formed and finally shaped on the pinion. This of course is due to the fact that the teeth at the top of the pinion as illustrated in the FIGURE, are moving directly away from the viewer. On the other hand, the teeth at the bottom of the die which are engaging and forming the teeth at the top of the pinion have a component of motion parallel to the axis of the pinion 14 which extend to the right as viewed in the FIGURE. This component of motion is designated by the arrow 20 in the FIGURE.

Thus, by a proper selection of helix angle of the die teeth, it is possible to develop a component of force as a result of crossed axes slide which is parallel to the axis of the pinion and which is equal and opposite to the component of force parallel to the axis of the pinion developed by the driving forces acting between the teeth of the die and pinion.

It has been found that when these forces are substantially balanced, deflection of machine parts is substantially eliminated and a smooth rolling operation results.

When the die is designed to operate with its axis parallel to the axis of the pinion or work blank, the teeth produced on the pinion are of a helix angle equal in magnitude and opposite in hand to the teeth on the die. In order to provide a balancing component of axial force due to crossed axes slide, the helix angle of the teeth of the die will be increased in magnitude by a small angle, normally between ½° and 4°. When this pinion is then set at a crossed axes so as to produce the required helix angle of teeth on the pinion, the actual forces due to tooth inclination and crossed axes slide are opposed and may be balanced or substantially balanced by selection of the appropriate helix angle. The exact helix angle giving the best results may require trial and error. However, this trial may be carried out by using a single approximately correct helix angle die at slightly different crossed axes. While this will produce corresponding slight differences in helix angle on the teeth of the gear, the best helix angle setting can be determined after which further dies may be produced having teeth of the helix angle to operate at the predetermined crossed axes setting to produce teeth of precisely the required helix angle on the pinion.

By way of example, a pinion having 50° left hand helical teeth may be produced by a die having 52° right hand helical teeth at a crossed axes setting of 2°.

In the foregoing description of the principles involved, reference has been made to the FIGURE which shows a pinion produced or finished by rolling engagement with a single gear-like die. It is to be understood that the invention may be practice in a finish rolling operation in which a gear has been produced by conventional methods such for example as hobbing, shaper cutting, or the like, and in which the rolling operation as described herein is to displace a relatively small amount of material to bring the gear to exact required final dimensions and to improve the surface and tooth form characteristics.

Alternatively of course, the method may be carried out by sinking the rolling die into a cylindrical blank so as to form the teeth simply by the rolling operation.

While the FIGURE illustrates a single die in mesh with the pinion, it is to be understood that the invention may be carried out by using a single die, a pair of opposed dies, or even an arrangement of three or more dies spaced angularly about the periphery of the pinion or blank. Where the operation is rolling teeth on a cylindrical blank, or rolling a gear from the solid, it will normally be accomplished by a plurality of dies so as to balance radial forces on the pinion.

It will of course further be understood that where two or more dies are employed simultaneously on a pinion or blank, the axial thrust produced on the teeth of the pinion by both or all of the dies must be considered, and that in addition, the axial thrust of both or all of the dies resulting from the crossed axes sliding action producing components of force acting axially of the pinion, must be considered.

The foregoing may be expressed as requiring the algebraic sum of all of the components of forces between the pinion and the die or dies in engagement therewith acting axially of the pinion is substantially zero.

What I claim as my invention is:

1. The method of rolling the teeth of pinions of high helix angle to produce teeth thereon of final finished form by a displacement of metals which comprises providing a gear-like rolling die having smooth surfaced helical teeth in which the helix angle is of slightly greater magnitude and opposite hand from the teeth to be formed on the pinion and selected in relation to the helix angle of the pinion teeth to cause the axial component of force on the pinion during rotation due to pressure between the tooth surfaces of the die and pinion to substantially balance the axial component of force on the pinion due to the friction during rotation between the tooth surfaces due to the crossed axes relationship of the die and pinion, positioning the die with its axis crossed with respect to the axis of the pinion at an angle determined by the difference in magnitude of the helix angle of the die teeth and the teeth to be formed on the pinion, driving the die in rotation, and relatively moving the die and pinion along a line perpendicular to and intersecting their axes with sufficient force to sink the die teeth into the material of the pinion to displace the material to form the pinion teeth to final form.

2. The method as defined in claim 1 in which the teeth formed on the pinion have a helix angle in excess of 45°.

3. The method as defined in claim 1 in which the crossed axes angle is between 30' and 4°.

4. The method as defined in claim 1 in which the teeth formed on the pinion have a helix angle in excess of 45°, and in which the crossed axes angle is between 30' and 4°.

5. The method as defined in claim 1 which comprises employing a plurality of dies simultaneously in circumferentially spaced relation about the periphery of the pinions.

6. The method as defined in claim 5 in which the helix angles of the dies are selected such that the algebraic sum of axial components of thrust on the pinion as a result of forces applied to the teeth of the pinion in effecting rotation thereof and the forces developed by the crossed axes sliding action between the teeth of the dies and the teeth of the pinion is substantially zero.

7. The method as defined in claim 1 in which the pinion at the start of the rolling operation is in the form of a substantially cylindrical blank and in which pinion teeth are initially rolled up out of the material of the blank and finally finished rolled to final form.

* * * * *